(12) United States Patent
Adlerstein (10) Patent No.: US 9,014,626 B2
(45) Date of Patent: Apr. 21, 2015

(54) LOW NOISE BIAS CIRCUIT FOR PHASED ARRAY ANTENNA ELEMENT

(75) Inventor: Michael G. Adlerstein, Wellesley, MA (US)

(73) Assignee: Raytheon Company, Waltham, MA (US)

( * ) Notice: Subject to any disclaimer, the term of this patent is extended or adjusted under 35 U.S.C. 154(b) by 443 days.

(21) Appl. No.: 13/562,948

(22) Filed: Jul. 31, 2012

(65) Prior Publication Data

US 2014/0038529 A1 Feb. 6, 2014

(51) Int. Cl.
*H04B 5/00* (2006.01)
*H04B 1/38* (2006.01)
*H04B 1/16* (2006.01)

(52) U.S. Cl.
CPC .................................. *H04B 1/1607* (2013.01)

(58) Field of Classification Search
CPC ........... H04B 1/1607; H04B 1/16; H04B 1/38
USPC .................... 455/41.1, 280, 571, 73; 370/108
See application file for complete search history.

(56) References Cited

U.S. PATENT DOCUMENTS

| 3,708,697 | A  | * | 1/1973  | Georgopoulos | ............... | 327/108 |
| 6,804,559 | B1 | * | 10/2004 | Kraus et al. | ..................... | 607/32  |
| 2011/0081879 | A1 | * | 4/2011 | Sato | .............................. | 455/280 |
| 2012/0064953 | A1 | * | 3/2012 | Dagher et al. | ................ | 455/571 |

\* cited by examiner

*Primary Examiner* — Wesley Kim
*Assistant Examiner* — Raj Chakraborty
(74) *Attorney, Agent, or Firm* — Daly, Crowley, Mofford & Durkee, LLP (57) ABSTRACT

An antenna element includes a bias network circuitry for: during a receive mode, charging a transmit supply capacitor from a transmit power source while decoupling a receive supply capacitor from a receiver power source and coupling the receive supply capacitor to discharge and thereby provide bias to the receiver; and during a transmit mode, charging the receive supply capacitor from the receive power source while decoupling the transmit supply capacitor from the transmit power source and coupling the transmit supply capacitor to discharge and thereby provide bias the transmitter. The antenna element includes a phase shifter/attenuator section having an amplifier and a phase shifter and wherein bias voltage is provided to the amplifier and phase shifter by the transmit supply capacitor during the transmit mode and the receive supply capacitor during the receive mode.

14 Claims, 7 Drawing Sheets

LOW NOISE BIAS CIRCUIT FOR PHASED ARRAY ANTENNA ELEMENT

TECHNICAL FIELD

This disclosure relates generally to phased array antenna elements and more particularly to low noise bias power circuits for such phased array antenna elements.

BACKGROUND AND SUMMARY

As is known in the art, phased array systems are used to collimate and direct a beam of wave energy, such as, for example electromagnetic energy, as in phased array antenna systems used in radar systems or in optical beam energy systems, or In acoustic energy systems as in ultrasound systems or sonar systems.

Figure 1:
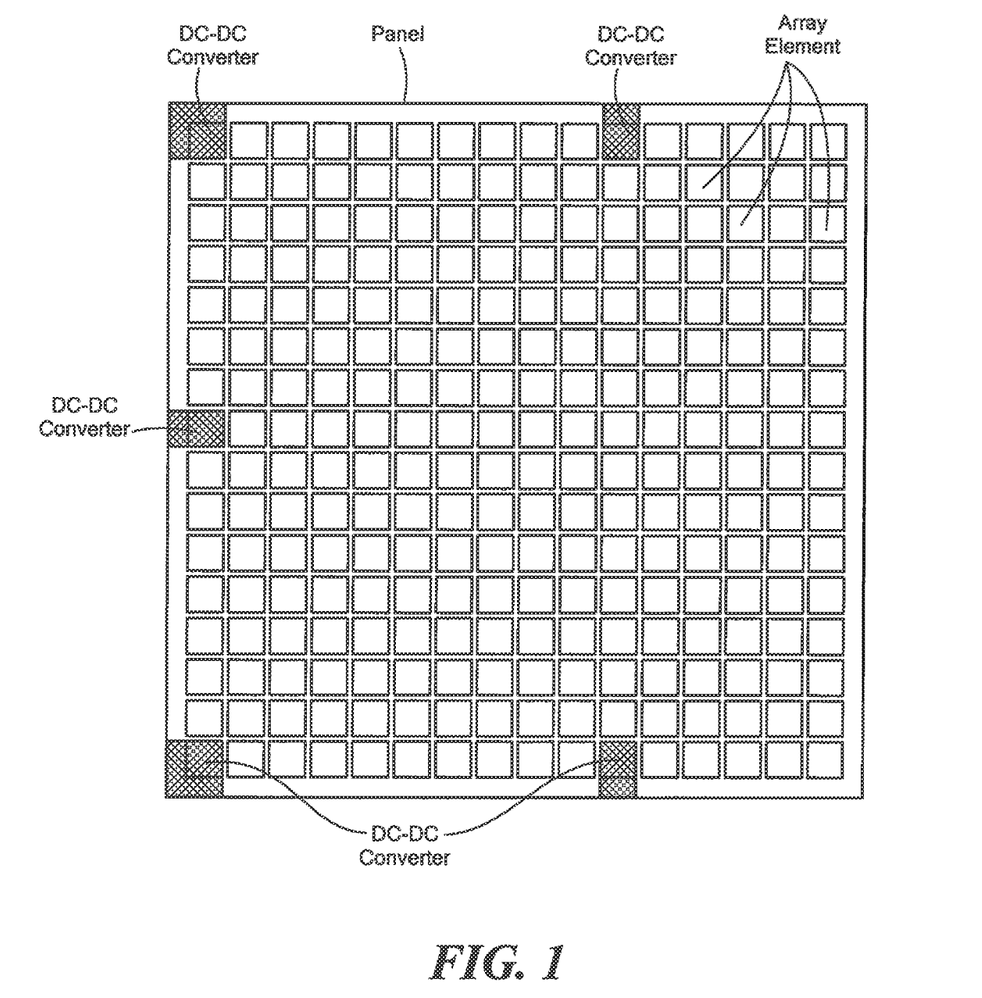
FIG. 1 is a front view of a panel array of antenna elements according to the PRIOR ART.
Figure 1A:
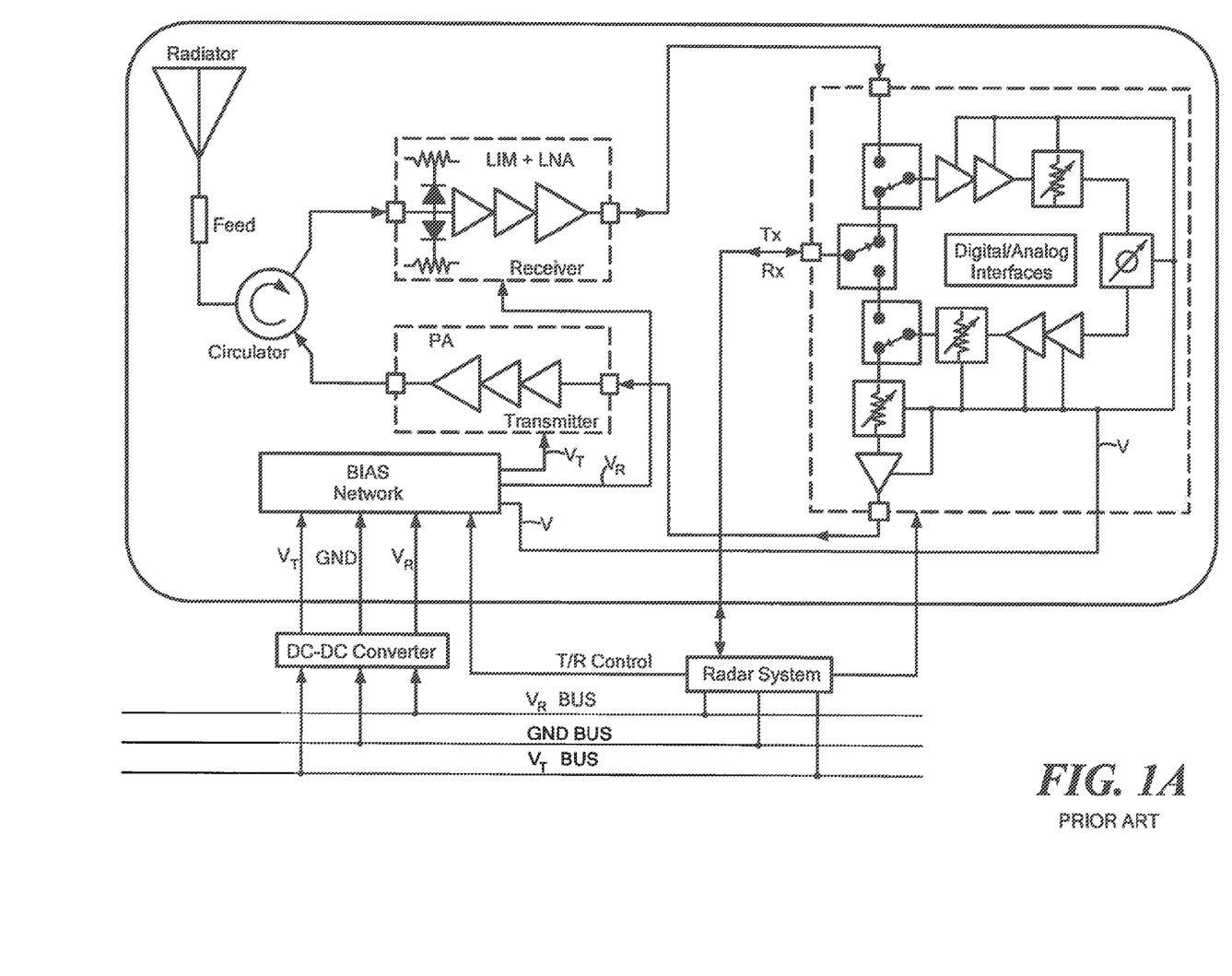
FIG. 1A is block diagram of an exemplary one of an array of antenna elements, shown in transmit mode, coupled to a radar system and having a transmitter and receiver alternatively oppositely biased "on" and "off" by a bias network according to the PRIOR ART.

One such radar phased array antenna system includes a flat panel having rows and columns of antenna array elements and interspersed DC DC converters, as shown in FIG. 1, each array element having: an antenna, a transmitter and receiver coupled to the antenna element through a circulator or transmit/receive switch, and a phase shifter/attenuation section (i.e., Common Leg Circuit (CLC)) coupled to a radar system, as shown in FIG. 1A for an exemplary one of the array elements. The flat panel. is sometimes referred to as a Circuit Card Array, (CCA) comprised of a collection of Unit Cells (i.e., the above-described antenna element) that contains highly integrated electronic circuits, antennas and other microwave components, as shown in FIG. 1.

The radar system produces a transmit voltage between a $V_{TBUS}$ and a ground bus $V_{GND}$ for all of the array elements and a receive voltage between a $V_{R\;BUS}$ and the ground bus $V_{GND}$ for all of the arrays elements. The DC-DC converters are coupled to these busses as shown in FIG. 1A to provide, for each array element, a transmit voltage source $V_T$ and a receive voltage source $V_R$, each relative to ground potential. It should be understood that the voltage $V_{TBUS}$ may be different from the voltage $V_T$, and the that voltage $V_{R\;BUS}$ may be different from the voltage $V_R$.

Figure 1B:
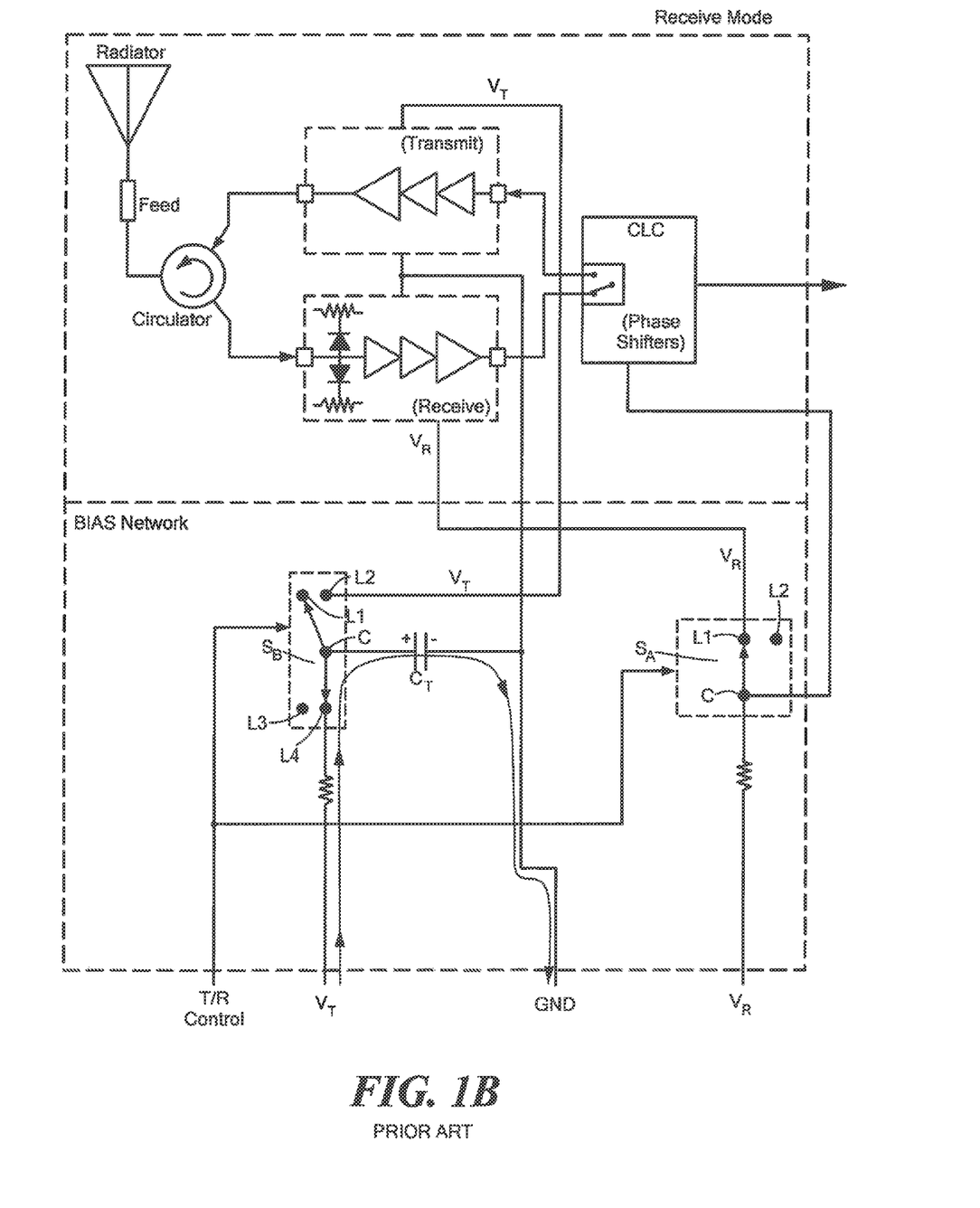
FIG. 1B is a block diagram of the array element of FIG. 1A, according to the PRIOR ART, such array element having a bias network. shown in the receive mode.
Figure 1C:
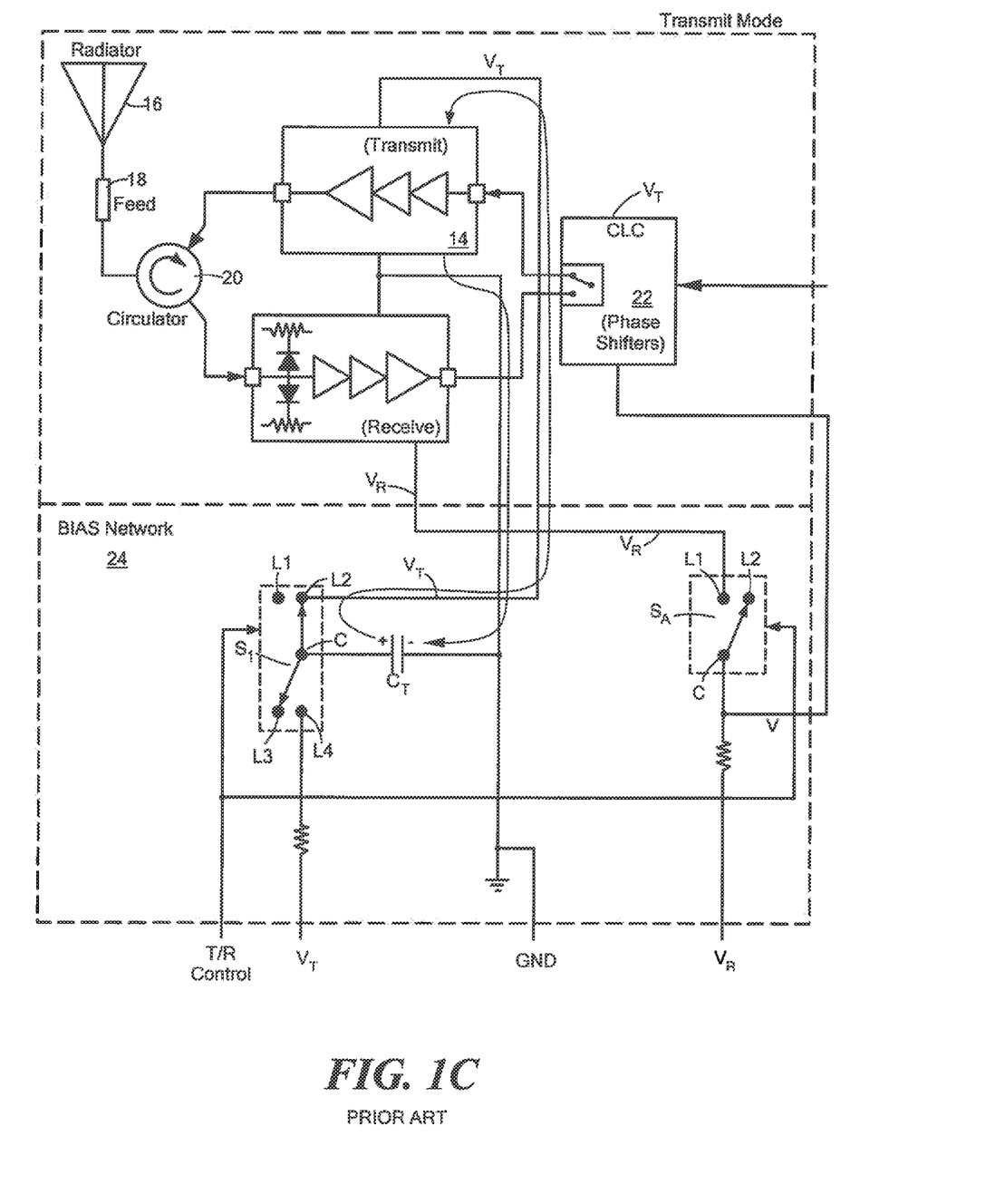
FIG. 1C is a block diagram of the array element of FIG. 1, according to the PRIOR ART, such array dement having a bias network being shown in the transmit mode.

Within each element, the phase shifter/attenuation section provides the phase setting, amplifications and control functions to provide, with other elements in the array, the collimated and directed beam of radio frequency energy, The array element also includes a bias network responsive to a transmit/receive (T/R) control signal provided by the radar system. The function of the bias network is to provide "on" DC bias $V_{PA}$ (here indicated as the voltage $V_T$) to an RF Power Amplifier (PA), here a Gall power amplifier, used in the transmit section of the array element during the transmit mode. In the absence of such bias, the transmitter is "off", Likewise, the bias network provides "on" DC bias $V_{Rx}$ (here indicated as the voltage $V_R$) to a Low Noise Amplifier (LNA), here a GaAs limiter and LNA, in the receiver section of the array element during the receive mode. In the absence of such bias, the receiver is "off", The bias network also provides DC bias voltage $V_{CLC}$ (here indicated as V) to amplifiers, variable attenuators, and phase shifter used in the phase shifter/attenuation section of the Common Leg Circuit, More particularly, referring to FIG. 1B, the bias network includes a capacitor $C_T$ selectively coupled to either: (1) a transmit power source here the transmit voltage source $V_T$ provided by the DC-DC converter during a receive mode; or (2) the transmit section, as shown in FIG. 1C during the transmit mode. The bias network includes a pair of switches $S_A$ and $S_B$ operated by the transmit/receive (T/R) control signal provided by the radar system. Switch $S_A$ has a common terminal C and two pair of terminals $L_1$, and $L_2$; and $L_3$ and $L_4$. Switch, $S_B$ has a common terminal C and a single pair of terminals $L_1$ and $L_2$. The phase/amplitude control signals for the phase shifter/attenuator section are provided by a beam steering computer, not shown, within the radar system.

Referring now more particularly to FIG. 1C, during a receive mode (or during an initialization phase), switches $S_A$ and $S_B$ are positioned as shown, More particularly, the common C of switch $S_A$ is connected to $L_1$ and to $L_4$. The DC-DC converter produced voltage $V_T$ is therefore coupled to capacitor $C_T$ and decoupled from the transmitter to bias the transmitter "off". Therefore, the capacitor $C_T$ is charged by the DC-DC converter voltage $V_T$ by a charging path indicated by the arrow. The common C of switch $S_B$ is connected to $L_1$ and decoupled from terminal $L_2$ thereof so that the receiver is biased "on" by a second DC-DC converter voltage $V_R$.

During the transmit mode, as shown in FIG. 1C, switches $S_A$ and $S_B$ are positioned as shown. More particularly, the common C of switch $S_A$ is connected to $L_2$ and $L_3$ and therefore the DC-DC converter voltage $V_T$ is decoupled from the transmitter and the transmitter is biased "on" by the charge stored on the capacitor $C_T$. The common terminal C of switch $S_B$ is coupled to terminal $L_2$ and decoupled from terminal $L_1$ thereby removing the DC-DC converter voltage $V_R$ from the receiver to thereby bias the receiver "off".

The inventor has recognized that power provided by the DC bias source also has accompanying unwanted noise from various sources. The bias network itself is typically a Single Pole Double Throw switch. During the receive portion of the periodic transmit/receive Radar Cycle, the capacitor $C_T$ is charged from a voltage source $V_T$. This capacitor is located close to the PA and is large enough to provide all the energy needed for the transmit pulse. The proximity of the capacitor to the PA insures that the pulse shape is sharp and does not suffer from the inductance and resistance of the radar system power busses under high current conditions. Because of the transmit duty cycle, the discharge versus charge current ratio can be as high as 10 to 1. In the systems described above in connection with FIGS. 1A, 1B and 1C, an important function of the capacitor $C_T$ is to allow disconnect of the transmitter from the radar system power busses and thereby prevent bus noise from corrupting the transmit signal. Indeed, during transmit, bias power is provided only from the proximal capacitor, $C_T$. On the other hand, the inventor has recognized that in the system described above in connection with FIGS. 1A, 18 and 1C, the receive bias, V, is provided by a separate, potentially noisy, power bus connected to the bias network typically at a lower voltage than that for transmit. There is a separate bias switch shown in FIGS. 1B and 1C synchronized to disconnect the receiver when the transmitter is on. The array element must be biased during both the transmit mode and receive mode. The bias power required by the receiver is small compared with that needed by the transmitter. Accordingly, the receive power is provided directly from the radar system low voltage power bus without providing a local storage capacitor. However, the inventor has recognized that with this configuration, bus noise can be impressed not only on CLC but also on the receiver. These noise sources degrade system signal to noise ratio. The system of the present disclosure introduces a capacitor that provides stored energy to power the CLC and receive functions within the antenna element.

In accordance with the present disclosure, an antenna element, comprises: a transmitter; a receiver; a transmit supply capacitor; a receiver capacitor; a transmit power source; a receive power source; and bias network circuitry for: during a receive mode, charging the transmit supply capacitor from the transmit power source while decoupling the receive supply capacitor from the receiver power source and coupling the receive supply capacitor to discharge and thereby provide bias to the receiver; and during a transmit mode, charging the receive supply capacitor from the receive power source while decoupling the transmit supply capacitor from the transmit supply capacitor and coupling the transmit supply capacitor to discharge and thereby provide bias the transmitter.

Disconnecting the array elements in the array from a common source of power allows for element-by-element noise de-correlation thereby improving noise performance for the array. Because of the phasing of the switch states, the receiver bias capacitor is charged and discharged inversely to charging and discharging of the transmit supply capacitor. Providing local energy storage to all the circuit components will improve the shaping of the bias pulses.

In one embodiment, the antenna element includes a phase shifter/attenuator section having an amplifier and a phase shifter and wherein bias voltage is provided to the amplifier and phase shifter by the transmit supply capacitor during the transmit mode and the receive supply capacitor during the receive mode.

The details of one or more embodiments of the disclosure are set forth in the accompanying drawings and the description below. Other features, objects, and advantages of the disclosure will be apparent from the description and drawings, and from the claims,

DETAILED DESCRIPTION

Figure 2:
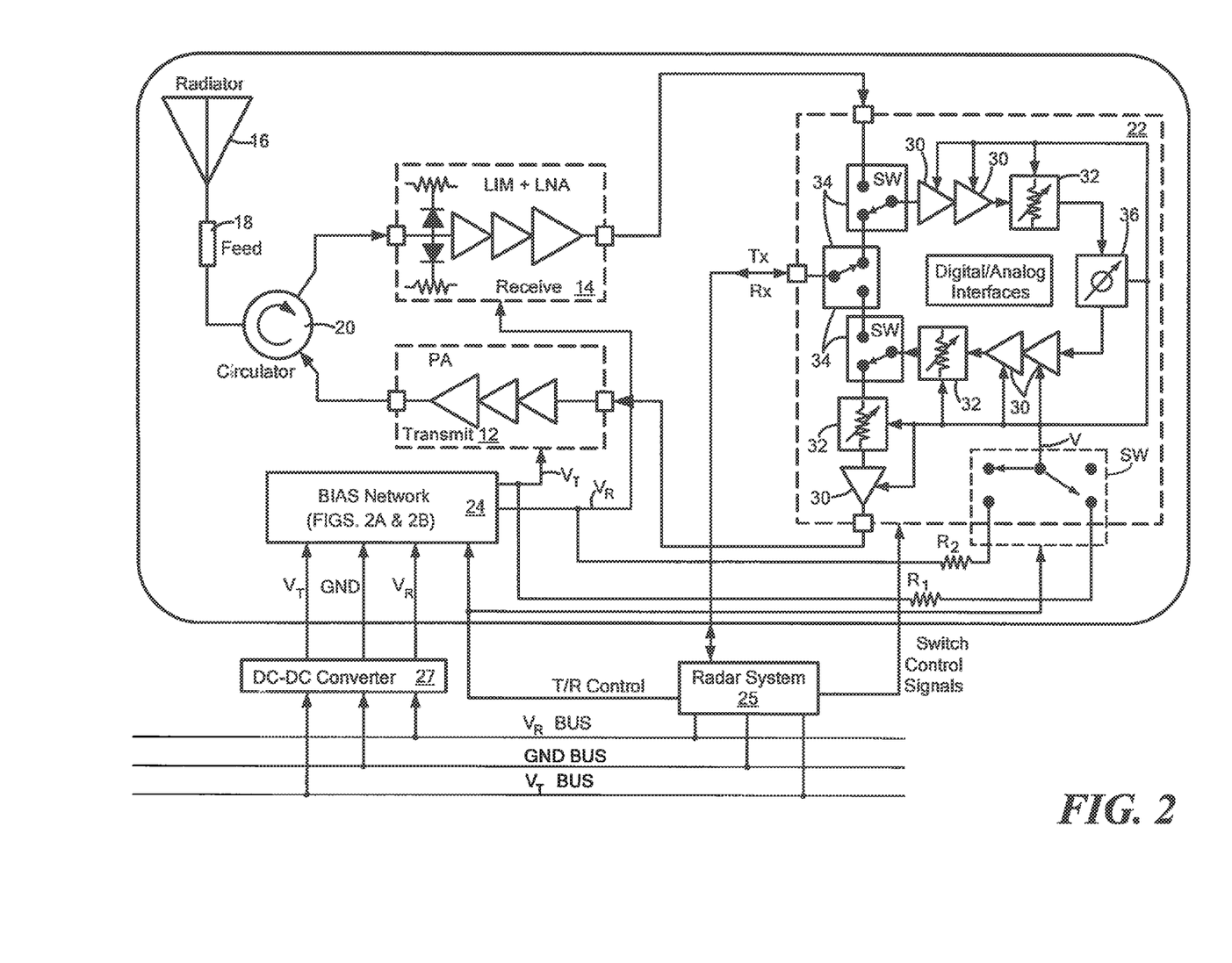
FIG. 2 is block diagram of an exemplary one of an array of antenna elements adapted for use in the panel of FIG. 1 having a transmitter and receiver alternatively oppositely biased "on" and "off" by a bias network according to the disclosure.

Referring now to FIG. 2, is block diagram of an exemplary one of an array of antenna elements 10 adapted for use in the panel of FIG. 1 is shown in the transmit mode. Thus the antenna array element 10 is shown to include: a transmitter 12 and a receiver 14 coupled to an antenna 16 through microwave feed 18 and a circulator 20. The array element 10 includes a phase shifter/attenuator section 22, coupled to the transmitter 12 and receiver 14 and a radar system 25 in a conventional manner, as shown, and a bias network 24 fed by a transmit/receive (PR) control signal by the radar system 25.

The DC "on" and "off" biasing of the receiver 14 and transmitter 12 is performed by the bias network 24. The radar system 24 provides transmit power, i.e., a voltage between bus $V_{T\ BUS}$ and ground bus $GND_{BUS}$ and provides receive power, i.e., a voltage between bus $V_{R\ BUS}$ and ground bus GND, More particularly, the radar system 25 produces a transmit voltage between a $V_{TBUS}$ and a ground bus $V_{GND}$ for all of the array elements and a receive voltage between a $V_{RBUS}$ and the ground bus $V_{GND}$ for all of the arrays elements. The DC-DC converters 27, an exemplary one of the converters 27 being shown in FIG. 2 are coupled to these busses to provide, for each array element, a transmit voltage source $V_T$ and a receive voltage source $V_R$, each relative to ground potential. It should be understood that the voltage $V_{TBUS}$ may be different from the voltage $V_T$, and that the voltage $V_{R\ BUS}$ may be different from the voltage $V_R$.

The phase shifter/attenuator section 22 includes a plurality of amplifiers 30, variable attenuators 32, variable phase shifter 34 and switches 34 controlled by control signals produced by the radar system 25 in a conventional manner to switch the phase shifter/attenuator section 22 periodically between the transmit mode, as shown, and receive mode and to also control the phase and attenuation of the phase shifter/attenuator relative to the phase and attenuation of other phase shifter/attenuation sections in the array panel thereof to provide a desired collimated and directed antenna beam.

The bias network 24 provide an "on" DC bias $V_T$ to an RF Power Amplifiers (PAs), here a GaN power amplifiers, used in the transmitter 12 of the array element 10 during the transmit mode. In the absence of such bias, the transmitter 12 is "off". Likewise, the bias network 24 provides "on" DC bias $V_R$ to an Low Noise Amplifier (LNA), here a GaAs limiter and LNA of the receiver 14 of the array element 10 during the receive mode. In the absence of such bias, the receiver 14 is "off". The bias network 24 also provide DC bias voltage V to the amplifiers 30, variable attenuators 32, and phase shifter 36 used in the phase shifter/attenuator 22. More particularly, the phase shifter/attenuator 22 includes a switch SW. The voltage $V_T$ is fed to one input terminal of the switch SW through a resistor $R_1$ and the voltage $V_R$ is fed to another input terminal of the switch SW through a resistor $R_2$. The resistors R1 and R2 have different values such that the voltage $V_T$ minus the voltage drop across the resisitor R1 equals the voltage V and the voltage $V_R$ minus the voltage drop across the resisitor R2 equals the voltage V. In response to the T/R control signal produced by the radar receiver 25, during the transmit mode, switch SW couples the DC bias voltage $V_T$ through resistor $R_1$ as the voltage V and during the receive mode the switch SW couples the voltage $V_R$ through resistor $R_2$ to provide the voltage V. It should be understood that other devices or circuits may be used to changes the voltages $V_T$ and $V_R$ to the voltage V.

Figure 2A:
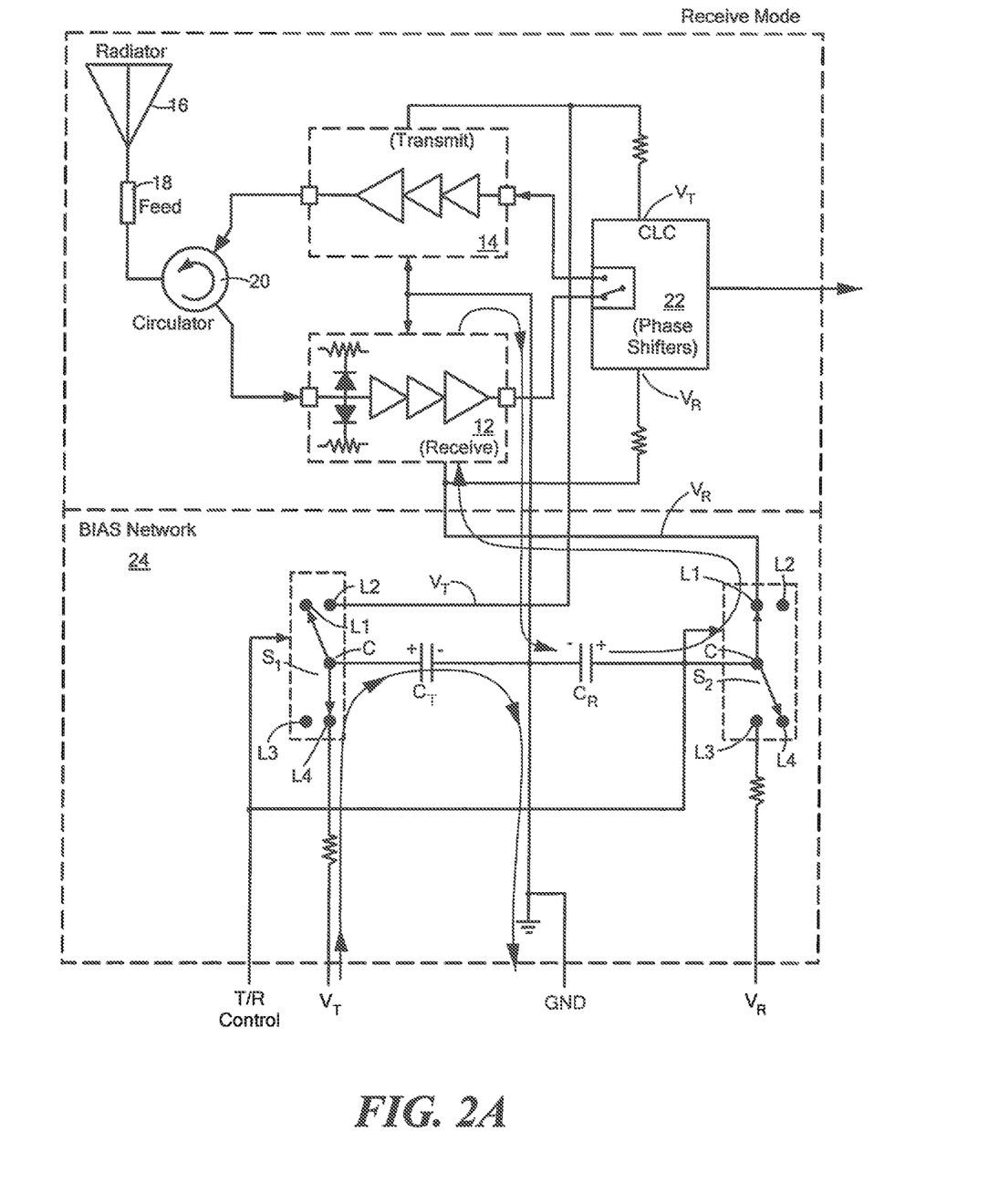
FIG. 2A is a block diagram of the array element of FIG. 2 according to the disclosure, such array element having a bias network being shown in the receive mode.
Figure 2B:
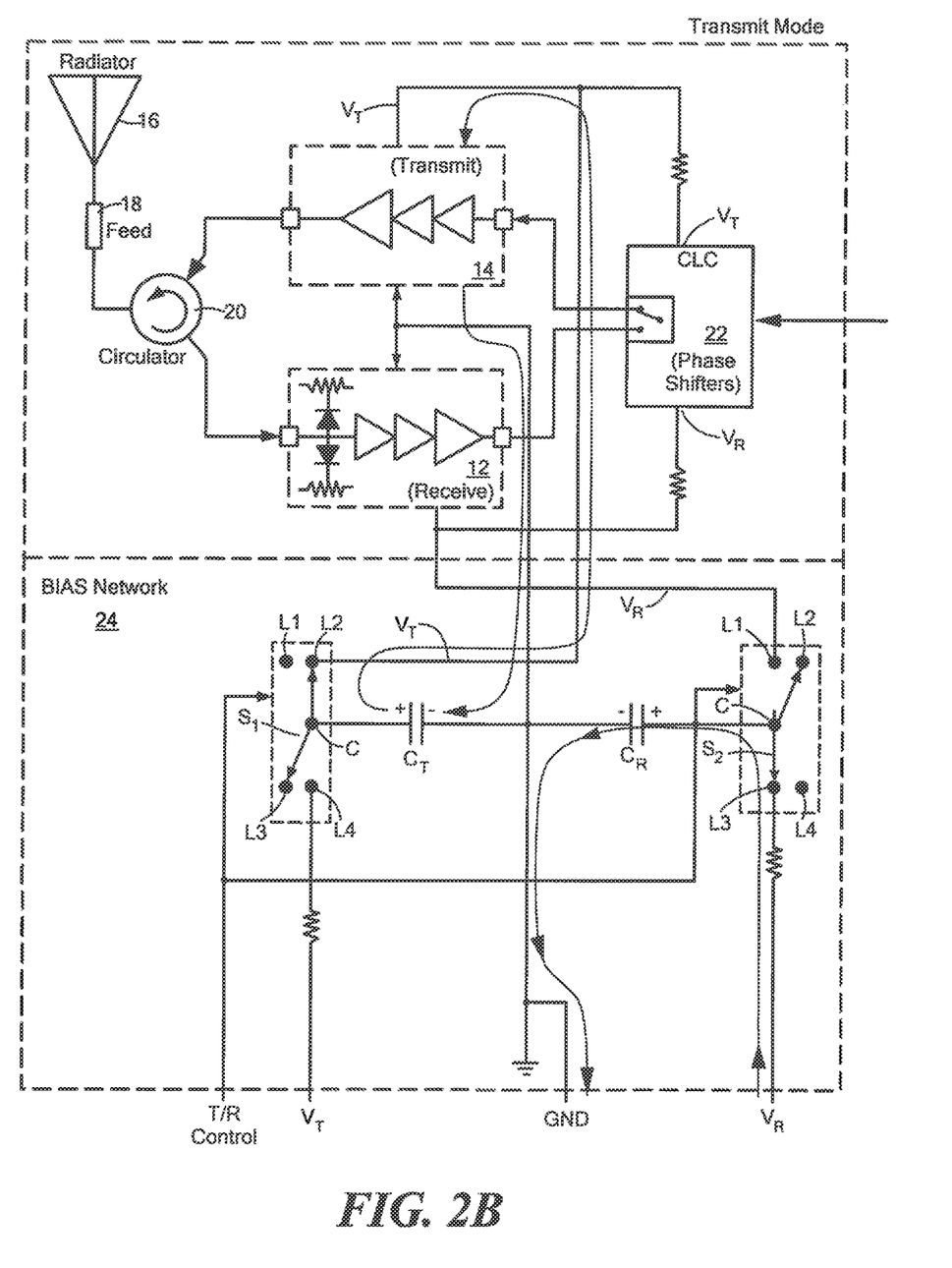
FIG. 2B is a block diagram of the array element of FIG. 2 according to the disclosure, such array element having a bias network being shown in the transmit mode; Like reference symbols in the various drawings indicate like elements.

Referring to FIG. 2A, the bias network 24 is shown in more detail to include: transmit supply capacitor $C_T$; a receiver supply capacitor $C_R$; a transmit power source, here a voltage source provided by a transmit power source here a voltage source $V_T$ provided by a DC-DC converter 27 from the $V_T$ power bus, relative to ground on a GND bus from by the radar system 25 to the array elements, as shown in FIG. 2B; a receive power source $V_R$ provided by a DC-DC 27 from the $V_R$ power bus, relative to ground on a GND bus by the radar system 25 to the array elements, as shown in FIG. 2B; and switching circuitry 30 for: (A) during a receive mode (with switches $S_1$ and $S_2$ of the switching circuitry 30 in the positions shown in FIG. 2A), charging the transmit supply capacitor $C_T$ from the transmit power source $V_T$ while decoupling the receive supply capacitor $C_R$ from the receiver power source $V_R$ and coupling the receive supply capacitor $C_R$ to discharge and thereby provide bias to the receiver 14; and, (B) during a transmit mode (with switches $S_1$ and $S_2$ of the switching circuitry 30 in the positions shown in FIG. 2B), charging the receive supply capacitor $C_R$ from the receive power source $V_R$ while decoupling the transmit supply capacitor $C_T$ from the transmit supply capacitor $C_T$ and coupling the transmit supply capacitor to discharge and thereby provide bias to the transmitter.

More particularly, referring to FIG. 2A, the bias network 24 includes a transmit supply capacitor $C_T$ selectively either coupled to a DC-DC converter $V_T$ through a resistor, as shown. In place of this resistor, other means of bias voltage regulation may be used. The bias network includes a pair of switches $S_A$ and $S_B$ operated by the transmit/receive (T/R) control signal provided by the radar system 25 (FIG. 2). Switch $S_A$ has a common terminal C and two pair of terminals $L_1$, and $L_2$; and $L_3$ and $L_4$. Switch $S_B$ has a common terminal C and a two pairs of terminals $L_1$ and $L_2$; and $L_3$ and $L_4$.

During a receive mode (or during an initialization phase), switches $S_A$ and $S_B$ are positioned as shown in FIG. 2A. More particularly, the common C of switch $S_A$ is connected to $L_1$ and to $L_4$. The DC-DC converter $V_T$ is therefore coupled to transmit supply capacitor $C_T$ and decoupled from the transmitter 12 to bias the transmitter 12 "off". Therefore, the transmit supply capacitor $C_T$ is charged by the DC-DC converter. The common C of switch $S_B$ is connected to $L_1$ and $L_4$ to couple receive supply capacitor $C_R$ (previously charged during a prior transmit mode by a DC-DC converter $V_R$ in a manner to be described below in connection with FIG. 2B) to provide the "on" bias voltage to the receiver 14 and to decoupled the receive supply capacitor $C_R$ from the DC-DC converter $V_R$.

During the transmit mode, as shown in FIG, 2, switches $S_A$ and $S_B$ are positioned as shown. More particularly, the common C of switch $S_A$ is connected to $L_2$ and $L_3$ and therefore the DC-DC converter is decoupled from the transmitter 12 and the transmitter 12 is biased "on" by the charge stored on the transmit supply capacitor $C_T$. The common terminal C of switch $S_B$ is coupled to terminals $L_2$ and $L_3$ to remove the DC-DC converter $V_R$ from the receiver 14 to thereby bias the receiver "off"; while the voltage $V_R$ is coupled to the receive supply capacitor $C_R$ to thereby charge the receive supply capacitor $C_R$.

It is noted that the terminal $L_2$ of switch $S_1$ provides needed transmitter bias voltage the voltage from the transmit supply capacitor $C_T$. This voltage is fed to both the transmitter 12 and the phase shifter/attenuator 22 during the transmit mode and the terminal $L_1$ of switch $S_2$ voltage $V_R$ is fed to both the receiver 14 and the phase shifter/attenuator 22 during the receive mode. Referring to FIG. 2, and as noted above, both of the voltages $V_R$ and $V_T$ are fed to the switch SW in the phase shifter/attenuator 22. In response to the SW signal produced by the transmitter 25, as noted above, during the transmit mode, switch SW couples the DC bias voltage $V_T$ as the voltage V for biasing the amplifiers 30, variable attenuators 32, and phase shifter 36 used in the phase shifter/attenuator 22 and during the receive mode the switch SW couples the voltage $V_R$ to provide the voltage V the amplifiers 30, variable attenuators 32, and phase shifter 36 used in the phase shifter/attenuator 22. Thus, both during the transmit mode and the receive mode, the DC bias for the amplifiers 30, variable attenuators 32, and phase shifter 36 used in the phase shifter/attenuator 22 is a relatively low noise voltage provided by either transmit supply capacitor $C_T$ or receive supply capacitor $C_R$ and not directly from a noisy DC-DC converter.

A number of embodiments of the disclosure have been described. Nevertheless, it will be understood that various modifications may be made without departing from the spirit and scope of the disclosure. For example, voltage regulators may be used in place of the bias resistors in the circuits, Accordingly, other embodiments are within the scope of the following claims.

What is claimed is:

1. An antenna element, comprising:
   a transmitter;
   a receiver;
   a transmit supply capacitor;
   a receiver supply capacitor;
   a transmit power source;
   a receive power source;
   bias network circuitry for:
   during a receive mode, charging the transmit supply capacitor from the transmit power source while decoupling the receive supply capacitor from the receiver power source and coupling the receive supply capacitor to discharge and thereby provide bias to the receiver;
   during a transmit mode, charging the receive capacitor from the receive power source while decoupling the transmit supply capacitor from the transmit supply capacitor and coupling the transmit supply capacitor to discharge and thereby provide bias the transmitter; and
   the transmitter and the receiver are connected at a first junction;
   wherein the transmit supply capacitor and the receive supply capacitor are connected at a second junction;
   a conductor connected between the first junction and the second junction to provide a portion of a discharge path; and wherein:
   during the receive mode the receive supply capacitor discharge is through the conductor; and
   during a transmit mode the transmit supply capacitor discharge is through the conductor.

2. The antenna element recited in claim 1 wherein the antenna element includes a phase shifter/attenuator section having an amplifier and a phase shifter and wherein bias voltage is provided to said amplifier and phase shifter by the transmit capacitor during the transmit mode and by the receive capacitor during the receive mode.

3. A phased array system, comprising:
   an array of antenna elements;
   a radar system coupled to the array of antenna elements, the radar system providing a transmit/receive control signal to the array of antenna elements, such radar system having a transmit voltage bus and a receiver voltage bus coupled to the array of antenna elements;
   wherein each one of the antenna elements comprises:
   a transmitter;
   a receiver;
   a transmit supply capacitor;
   a receiver supply capacitor;
   a transmit power source provided by the transmit voltage bus;
   a receive power source provided by the receive voltage bus;
   bias network circuitry for:
   during a receive mode selected by the transmit/receive control signal, charging the transmit supply capacitor from the transmit power source while decoupling the receive supply capacitor from the receiver power source and coupling the receive supply capacitor to discharge and thereby provide bias to the receiver;
   during a transmit mode selected by the transmit/receive control signal, charging the receive capacitor from the receive power source while decoupling the transmit supply capacitor from the transmit supply capacitor and coupling the transmit supply capacitor to discharge and thereby provide bias the transmitter; and the transmitter and the receiver are connected at a first junction;

wherein the transmit supply capacitor and the receive supply capacitor are connected at a second junction;

a conductor connected between the first junction and the second junction to provide a portion of a discharge path; and wherein:

during the receive mode the receive supply capacitor discharge is through the conductor; and during a transmit mode the transmit supply capacitor discharge is through the conductor.

4. The radar system recited in claim 3 including a DC-DC converter coupled between the transmit voltage bus and the antenna element.

5. The radar system recited in claim 4 including a DC-DC converter coupled between the receive voltage bus and the antenna element.

6. The antenna element recited in claim 3 wherein the antenna element includes a phase shifter/attenuator section having an amplifier and a phase shifter and wherein bias voltage is provided to said amplifier and phase shifter by the transmit capacitor during the transmit mode and by the receive capacitor during the receive mode.

7. The antenna element recited in claim 4 wherein the antenna element includes a phase shifter/attenuator section having an amplifier and a phase shifter and wherein bias voltage is provided to said amplifier and phase shifter by the transmit capacitor during the transmit mode and by the receive capacitor during the receive mode.

8. The antenna element recited in claim 5 wherein the antenna element includes a phase shifter/attenuator section having an amplifier and a phase shifter and wherein bias voltage is provided to said amplifier and phase shifter by the transmit capacitor during the transmit mode and by the receive capacitor during the receive mode.

9. An antenna section, comprising:

an antenna;

a transmitter coupled to the antenna during a transmit mode;

a receiver coupled to the antenna during a receive mode;

a transmit supply capacitor;

a receiver supply capacitor;

a transmit power source;

a receive power source;

bias network circuitry, comprising:

a first switch operative in response to a control signal;

a second switch operative in response to said control signal;

wherein the first switch is operative during the receive mode to couple the transmit supply capacitor between the transmit power source and a reference potential to charge the transmit supply capacitor from the transmit power source and decouple the transmit power supply from the transmitter;

a second switch is operative to, during the receive mode, decouple the receive supply capacitor from the receiver power source and couple the receive supply capacitor to the receiver to discharge the receive supply capacitor and thereby provide a receiver bias to the receiver during the receive mode;

wherein the second switch is operative during the transmit mode to decouple the receive supply capacitor from the receiver and couple the receive power supply between the receive supply capacitor and the reference potential to charge the receive supply capacitor from the receive power source during the transmit mode; and wherein the first switch is operative during the transmit mode to decouple the transmit supply capacitor from the transmit supply capacitor and couple the transmit supply capacitor to the transmitter to discharge the transmit supply capacitor and thereby provide transmit bias the transmitter during the transmit mode.

10. The antenna section recited in claim 9 wherein the antenna section includes a phase shifter/attenuator section having an amplifier and a phase shifter coupled to the transmitter and the receiver and wherein the transmit bias is provided to said amplifier and phase shifter by the transmit supply capacitor during the transmit mode and the receive bias is supplied by the receive supply capacitor during the receive mode.

11. The antenna section recited in claim 9 wherein the transmit supply capacitor is coupled between the first switch and the reference potential and the receiver supply capacitor is coupled between the second switch and the reference potential, one electrode of the transmit supply capacitor is connected to one electrode of the receiver supply capacitor at a junction and wherein the junction is connected to the reference potential.

12. The antenna element recited in claim 9 wherein the transmitter and the receiver are connected at a second junction; and including a conductor connected between the first-mentioned junction and the second junction to provide a portion of a discharge path; and wherein:

during the receive mode the receive supply capacitor discharge is through the conductor; and during a transmit mode the transmit supply capacitor discharge is through the conductor.

13. The antenna element recited in claim 1 wherein the transmit supply capacitor is connected to the receive supply capacitor.

14. The antenna element recited in claim 3 wherein the transmit supply capacitor is connected to the receive supply capacitor.

* * * * *